US008581894B2

(12) United States Patent
Tsuchi

(10) Patent No.: US 8,581,894 B2
(45) Date of Patent: Nov. 12, 2013

(54) OUTPUT CIRCUIT, DATA DRIVER AND DISPLAY DEVICE

(75) Inventor: Hiroshi Tsuchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 238 days.

(21) Appl. No.: 13/204,403

(22) Filed: Aug. 5, 2011

(65) Prior Publication Data

US 2012/0032939 A1 Feb. 9, 2012

(30) Foreign Application Priority Data

Aug. 6, 2010 (JP) ................................ 2010-177033

(51) Int. Cl.
*G06F 3/038* (2013.01)
*G09G 5/00* (2006.01)

(52) U.S. Cl.
USPC ............................................ 345/209; 345/96

(58) Field of Classification Search
USPC ................................................... 345/209, 96
See application file for complete search history.

(56) References Cited

U.S. PATENT DOCUMENTS 7,545,305 B2 6/2009 Tsuchi
2006/0066400 A1* 3/2006 Kang et al. .................... 330/255
2007/0126722 A1* 6/2007 Hashimoto .................. 345/204
2007/0159248 A1* 7/2007 Tsuchi ......................... 330/253
2007/0159250 A1* 7/2007 Tsuchi et al. ................ 330/253
2008/0036538 A1* 2/2008 Lee .............................. 330/255
2008/0174462 A1 7/2008 Tsuchi
2009/0303210 A1 12/2009 Nishimura

FOREIGN PATENT DOCUMENTS

JP 2008-116654 A 5/2008
JP 2009-244830 A 10/2009

* cited by examiner

*Primary Examiner* — Chanh Nguyen
*Assistant Examiner* — Long D Pham
(74) *Attorney, Agent, or Firm* — Sughrue Mion, PLLC

(57) ABSTRACT

An output circuit includes a differential amplifier circuit, an output amplifier circuit, a control circuit. The third power supply voltage is intermediate between the first and second power supply voltages. The differential amplifier circuit includes, between the first and second power supplies, a differential input stage, first and second current mirror and first and second junction circuits. The output amplifier circuit includes first and second transistors connected between the first and third power supplies. The control circuit includes a third transistor connected between the output of the second current mirror and an end of the second junction circuit and supplied with a bias signal having a voltage in accordance with the third power supply voltage.

20 Claims, 9 Drawing Sheets

REFERENCE CASE

REFERENCE CASE

963

OUTPUT CIRCUIT, DATA DRIVER AND DISPLAY DEVICE

TECHNICAL FIELD

This application is based upon and claims the benefit of the priority of Japanese patent application No. 2010-177033, filed on Aug. 6, 2010, the disclosure of which is incorporated herein in its entirety by reference thereto.

This invention relates to an output circuit, a data driver that uses the output circuit, and a display apparatus.

BACKGROUND

A liquid crystal display apparatus (LCD), featured by thin thickness, light weight and low power consumption, has recently come into widespread use, and is being predominantly used as a display for mobile equipment, such as portable telephone sets (mobile phones or cellular phones), PDA (Personal Digital Assistant), mobile information terminals or notebook PCs. In these days, the technique for enlarging the screen size or for coping with moving pictures has made progress such that it is possible nowadays to implement not only mobile equipment but also a stationary large screen display apparatus or a large screen liquid crystal TV. For such liquid crystal display apparatus, a liquid crystal display apparatus of the active matrix driving system, capable of high definition display, is currently used.

Referring to FIGS. 7A and 7B, an illustrative arrangement of a liquid crystal display apparatus of the active matrix driving system will be briefly described. FIG. 7A is a block diagram showing essential portions of a liquid crystal display apparatus, and FIG. 7B is a diagram showing essential portions of a unit pixel of a display panel of a liquid crystal display apparatus. In FIG. 7B, a unit pixel is schematically shown as an equivalent circuit.

Referring to FIG. 7A, a thin type display apparatus of the active matrix driving system includes a power supply circuit 940, a display controller 950, a display panel 960, a gate driver 970 and a data driver 980. The display panel 960 includes a matrix array of a plurality of unit pixels, each of which includes a pixel switch 964 and a display element 963. In the case of a color SXGA (Super eXtended Graphics Array) panel, for example, the matrix array includes 1280×3 pixel columns by 1024 pixel rows. On the display panel 960, a plurality of scan lines 961 that transmit scan signals output from the gate driver 970 to respective unit pixels and a plurality of data lines 962 that transmit gray scale voltage signals output from the data driver 980 are arranged in a lattice configuration. The gate driver 970 and the data driver 980 are controlled by the display controller 950. For example, clock signals CLK or control signals as needed are supplied by the display controller 950, and image data is supplied as digital signal to the data driver 980. The power supply circuit 940 supplies necessary supply power to the gate driver 970 and to the data driver 980. The display panel includes a semiconductor substrate. For a large screen display apparatus, in particular, a semiconductor substrate configured by an insulating substrate, formed of glass or plastics, is extensively used. The substrate includes a plurality of thin film transistors (TFTs), as pixel switches, formed thereon.

In the display apparatus, the on/off (conduction/non-conduction) of the pixel switch 964 is controlled by a scan signal. When the pixel switch 964 is turned on (rendered electrically conductive), a gray scale voltage signal, corresponding to the pixel data, is supplied to the display element 963. The display element 963 then is changed in luminance in response to the gray scale voltage signal, thus displaying a picture.

Each data equivalent to a single screen image is updated for each frame period which is usually about 0.017 sec for 60 Hz driving. Each scan line 961 selects (turns on) the pixel switch 964 from one pixel row to another, i.e., line-by line. During the time the pixel row is so selected, the gray scale voltage signal is supplied from each data line 962 via the pixel switch 964 to the display element 963. There are cases where a plurality of pixel rows is simultaneously selected by the scan line, or where the driving is by the frame frequency higher than 60 Hz.

Referring to FIGS. 7A and 7B, the liquid crystal display apparatus includes the display panel 960 including a semiconductor substrate, an opposite substrate, arranged facing the semiconductor substrate, and liquid crystal sealed in a gap between the two substrates. The semiconductor substrate has a matrix array of the pixel switches 964 and transparent pixel electrodes 973 as unit pixels. The opposite substrate has a single transparent electrode 974 extending on its entire surface. The display element 963, forming a unit pixel, includes the pixel electrode 973, the opposite substrate electrode 974, a liquid crystal capacitance 971 and an auxiliary capacitance 972. A backlight, not shown, is provided as a light source on a back side of the display panel.

When the pixel switch 964 is turned on (electrically conductive) by the scan signal from the scan line 961, a gray scale voltage signal from the data line 962 is applied to the pixel electrode 973. The backlight, transmitted through the liquid crystal, has its transmittance changed due to the potential difference between each pixel electrode 973 and the opposite substrate electrode 974. The potential difference is kept for certain time duration by the liquid crystal capacitance 971 and the auxiliary capacitance 972, even after the pixel witch 964 is turned off, thus providing a display.

It is noted that, in driving the liquid crystal display apparatus, the voltage polarity is reversed on a per pixel basis between plus and minus polarities with respect to the common voltage (COM) of the opposite substrate electrode 974 (inversion driving), usually every frame period, in order to prevent deterioration of the liquid crystal. As typical scheme for data line driving includes dot inversion driving where voltage polarities are made to differ between neighboring pixels, and column inversion driving where voltage polarities are made to differ between neighboring data lines. In the dot inversion driving, gray scale voltage signals of the polarities different from one selection period (one data period) to another are output to the data line 962. In the column inversion driving, gray scale voltage signals of the polarities which are the same from one selection period (one data period) to another are output to the data line 962 (In the column inversion driving, polarity inversion occurs every frame period).

FIG. 8 corresponds to FIG. 6 of Patent Document 1. As for details, reference may be made to the corresponding description of Patent Document 1. A differential stage 14 includes NMOS transistors MN11, MN12, MN13, MN15 and MN16, PMOS transistors MP11, MP12, MP13, MP15 and MP16, constant current sources 111 and 112, a floating current source 113 and switches SW11 and SW12. The NMOS transistors MN 11 and MN12, that have gates connected to a switch circuit 6 and an input terminal 12, respectively, composes an Nch differential pair. The constant current source 111, supplied with a negative power supply VSS, supplies a bias current to Nch differential pair transistors (NMOS transistors MN 11 and MN12). The PMOS transistors MP11 and MP12, that have gates connected to the switch circuit 6 and to the input terminal 12, respectively, compose a Pch differential pair. The constant current source 112, supplied with a positive power supply VDD, supplies a bias current to the Pch differential pair transistors (PMOS transistors) MP11 and MP12. The gates of the NMOS transistor MN 11 and the PMOS transistor MP11 are connected by the switch circuit 6 to an output terminal 11 or to an output terminal 21.

The PMOS transistors MP15 and MP16 have coupled sources connected to a power supply terminal 15 (positive power supply terminal voltage VDD), have drains connected respectively to the drains of the Nch differential pair transistors (NMOS transistors MN11 and MN12). The drain of the PMOS transistor MP15 is connected via switch SW11 and PMOS transistor MP13 to the floating current source 113. The gates of the PMOS transistors MP15 and MP16 are connected common to the floating current source 113 and to the drain of the PMOS transistor MP13. The PMOS transistors MP15 and MP16 thus operate as a folded cascode-connected active load. A bias voltage BP2 is supplied to the gate of the PMOS transistor MP13.

The NMOS transistors MN15 and MN16 have coupled sources connected to a power supply terminal 16 (negative power supply voltage VSS), have drains connected respectively to drains of Pch differential pair transistors (PMOS transistors MP11 and MP12). The drain of the NMOS transistor MN15 is connected via the switch SW12 and the NMOS transistor MN13 to the floating current source 113. The gates of the NMOS transistors MN15 and MN16 are connected in common to the floating current source 113 and to the drain of the NMOS transistor MN13. The NMOS transistors MN15 and MN16 thus operate as a folded cascode-connected active load. A bias voltage BN2 is supplied to the gate of the NMOS transistor MN13. The switches SW11 and SW12 are normally in an ON (conductive) state.

The drains of the NMOS transistor MN12 and the PMOS transistor MP16 are connected to an input stage output terminal 51, and are connected via switches SW51 and SW52 to an output stage 13 (source of PMOS transistor MP14) and to an output stage 23 (source of PMOS transistor MP24). The drains of the PMOS transistor MP12 and the NMOS transistor MN16 are connected to an input stage output terminal 52, and connected via switches SW53 and SW54 to the output stage 13 (source of NMOS transistor MN14) and to the output stage 23 (source of NMOS transistor MN24). In the above configuration, two input stage output signals Vsi11 and Vsi12, which are in accordance with an input signal Vin1, supplied to the input terminal 12, are output from the drains of the NMOS transistor MN12 and the PMOS transistor MP16 (input stage output terminal 51) and from the drains of the PMOS transistor MP12 and the NMOS transistor MN16 (input stage output terminal 52).

A differential stage 24 is configured in similar manner. However, for NMOS transistors MN11 to MN16, PMOS transistors MP11 to MP16, constant current sources 111 and 112, floating current source 113, switches SW11 and SW12, switches SW51 to SW54, bias voltages BP12 and BN12, input stage output terminals 51 and 52 and input stage output signals Vsi11 and Vsi12, read NMOS transistors MN21 to MN26, PMOS transistors MP21 to MP26, constant current sources 121 and 122, floating current source 123, switches SW21 and SW22, switches SW55 to SW58, bias voltages BP22 and BN22, input stage output terminals 53 and 54 and input stage output signals Vsi21 and Vsi22, respectively.

The differential stage 14 (24) has two differential pairs that receive the input signal Vin1 (Vin2). Each of the differential pairs includes a folded cascode-connected active load. The two differential pairs and active loads are configured by transistors of respective different conductivity types. Hence, two input stage output signals Vi11 and Vi12 (Vi21 and Vi22), which are supplied from the differential stages 14(24) to the output stage 13 or 23, are in-phase signals having different input levels.

In the differential stage 14 (24), when the voltage ranges of the input signals Vin1 (Vin2) are VSS to VDS(sat)+VGS, only the Pch differential pair (PMOS transistors MP11 and MP12 (MP21 and MP22)) is in operation. When the voltage ranges are (VDS(sat)+VGS to VDD−(VDS)(sat)+VGS), the Pch differential pair (PMOS transistors MP11 and MP12 (MP21 and MP22)) and the Nch differential pair (NMOS transistors MN11 and MN12 (MN21 and MN22)) are in operation. When the voltage ranges are (VDD−(VDS(sat)+VGS) to VDD), only the Nch differential pair (NMOS transistors MN11 and MN12 (MN21 and MN22)) is in operation. It is noted that VDS(sat) is a drain-to-source voltage at the change-over point of a tripod region and a pentode region of each of transistors that composes the constant current sources 111 and 112 (121 and 122), and VGS is a gate source voltage of each of the transistors that compose the differential pair (NMOS transistors MN11 and MN12 (MN21 and MN22) and the PMOS transistors MP11 and MP12 (MP21 and MP22)). As a result, the differential stages 14 and 24 operate rail-to-rail within the total voltage range of the input voltage of from VSS to VDD.

The output stage 13 dedicated to a positive-polarity, includes NMOS transistors MN14, MN17, and MN18, PMOS transistors MP14, MP17, and MP18 and phase compensation capacitances C1 and C2. The PMOS transistor MP17 and the NMOS transistor MN17 have drains coupled together, have sources also coupled together. In addition, bias voltages BP11 and BN11 are supplied to the gates of the transistors MP17 and MN17, which operate as a floating current source. The PMOS transistor MP14 has a gate connected to a constant bias voltage source (bias voltage BP12), and has a drain connected to one end of the floating current source (PMOS transistor MP17 and the NMOS transistor MN17). The NMOS transistor MN14 has a gate connected to a constant bias voltage source (bias voltage BN12), and has a drain connected to the other end of the floating current source (PMOS transistor MP17 and the NMOS transistor MN17). The PMOS transistor MP14 has a source connected via phase compensation capacitance C11 to the output terminal 11. The NMOS transistor MN14 has a source connected via phase compensation capacitance C12 to the output terminal 11.

The PMOS transistor MP18 has a drain connected to the drain of the NMOS transistor MN18 via the output terminal 11. The PMOS transistor MP18 has a gate connected to one end of the floating current source (and to the drain of the PMOS transistor MP 14), and has a source connected to the power supply terminal 15 (positive power supply terminal voltage VDD). The NMOS transistor MN18 has a gate connected to the other end of the floating current source (and to the drain of the NMOS transistor MN 14), and has a source connected to a power supply terminal 17 supplied with a power supply voltage VML.

The output stage 23 dedicated to a negative-polarity, is configured in similar manner. However, for NMOS transistors MN14, MN17 and MN18, PMOS transistors MP14, MP17 and MP18, phase compensation capacitances C11 and C12, power supply terminal 15 (positive power supply terminal voltage VDD), power supply terminal 17 (power supply voltage VML) and bias voltages BP11, BP12, BN11 and BN12, read NMOS transistors MN24, MN27 and MN28, PMOS transistors MP24, MP27 and MP28, phase compensation capacitances C21 and C22, power supply terminal 16 (negative power supply terminal voltage VSS), power supply terminal 18 (power supply voltage VMH) and bias voltages BP21, BP22, BN21 and BN22, respectively.

A switch SW61 controls connection between the output terminal 11 and the differential stage 14 (NMOS transistor MN11 and PMOS transistor MP11). A switch SW62 controls connection between the output terminal 11 and the differential stage 24 (NMOS transistor MN21 and PMOS transistor MP21). A switch SW63 controls connection between the output terminal 21 and the differential stage 24 (NMOS transistor MN21 and PMOS transistor MP21). A switch SW64 controls connection between the output terminal 21 and the differential stage 14 (NMOS transistor MN11 and PMOS transistor MP11).

The input transistors of the output stage 13 (PMOS transistor MP14 and NMOS transistor MN14) and the output transistors thereof (PMOS transistor MP18 and NMOS transistor MN18) are arranged symmetrically with respect to the output terminal 11. In similar manner, the input transistors of the output stage 23 (PMOS transistor MP24 and NMOS transistor MN24) and the output transistors thereof (PMOS transistor MP28 and NMOS transistor MN28) are arranged symmetrically with respect to the output terminal 21. The output stage 13 outputs a single-ended signal, which is produced based on two input-stage output signals Vsi11 and Vsi12, which are in phase with but differ in input level from each other, as an output signal Vout1 at the output terminal 11. In similar manner, the output stage outputs a single-end signal, which is produced based on two input-stage output signals Vsi21 and Vsi22, which are in phase with but differ in input level from each other, as an output signal Vout2 at the output terminal 21. It is noted that idling currents of the output transistors (PMOS transistor MP18 and NMOS transistor MN18) are determined by the bias voltages BP11 and BN11.

The arrangement of FIG. 8 is a half VDD amplifier, i.e., an amplifier whose driving power supply is provided for each of a positive-polarity dynamic range and for a negative-polarity dynamic range. The amplifier includes differential stages 14 (24) and output stages 13 (23). There are cases wherein, for the power supply voltage range of the differential stage 14 of VDD to VSS (VDD to VSS), the power supply voltage range of the output stage 13 is small and is VDD to VML, and wherein, in similar manner, for the power supply voltage range of the differential stage 24 of VDD to VSS, that of the output stage 23 is small and is VMH to VSS. For example, VML=VMH=VDD/2.

In driving a heavy load, such as that on a data line, at a high speed (for example, column inversion driving), the differential stage 14 is connected to the output stage 13 so that the positive polarity input voltage (Vin1) is applied to the differential stage 14, while the differential stage 24 is connected to the output stage 23 so that the negative polarity input voltage (Vin2) is applied to the differential stage 24. In case a positive polarity input voltage in the vicinity of the VDD power supply voltage is applied to the differential stage 14, with the output terminal being charged towards the VDD power supply voltage, the gate voltages of the transistors MP18 and MN18 of the output state 13 are transiently markedly lowered to the vicinity of the VSS power supply voltage which is lower than the intermediate power supply voltage VML. In this state, responsive to the change of the positive polarity input voltage towards the lower voltage side, for example, to the vicinity of VML, the NMOS transistor MN18 is not turned on until the gate voltages of the output stage transistors MP18 and MN18 are reverted to a value at which the output is in a stabilized state, and which is higher than VML. There occurs no changing over to the discharge operation, as a result of which there is produced a delay in the output signal voltage. In similar manner, in case a negative polarity input voltage in the vicinity of the VSS power supply voltage is applied to the differential stage 24, and the gate voltages of the output stage transistors MP28 and MN28 of the output stage 23 are appreciably increased to the vicinity of the VDD power supply voltage, with the change of the negative polarity input voltage towards the high voltage side, for example, to the vicinity of VMH, there is produced delay in the output signal voltage.

On the other hand, when the positive polarity input voltage in the vicinity of the power supply VML is applied to the differential stage 14, the gate voltages of the output stage transistors (MP18 and MN18) of the output stage 13 rise only to the vicinity of VDD. In this state, with the change of the positive polarity input signal to the VDD side, the gate voltages of the output stage transistors (MP18 and MN18) quickly revert to the voltage at which the output is in a stabilized state. The gate voltage of the output stage transistor MP18 continues to be lowered quickly to switch to the discharging operation. Thus, a delay of the output signal is scarcely produced. In similar manner, when the negative polarity input voltage in the vicinity of the power supply VMH is applied to the differential stage 24, the gate voltages of the output stage transistors MP28 and MN28 of the output stage 23 are lowered only to the vicinity of the VSS power supply voltage. In this state, with the change of the negative polarity input voltage towards the VSS side, a delay of the output signal voltage is scarcely produced.

FIG. 9 is re-drafted from FIG. 4 of Patent Document 2, in which the reference numerals are changed in re-drafting. Referring to FIG. 9, a positive polarity amplifier 210 includes a differential input stage, an intermediate stage and an output stage. The differential input stage of the positive polarity amplifier 210 includes a differential unit 210A including a current source M15 that has a first terminal connected to a low voltage source VSS, and an Nch differential pair (M11 and M12) that has coupled sources connected to the second terminal of the current source M15, and a Pch current mirror (M13 and M14). The Pch current mirror is connected between an output pair of the Nch differential pair (M11 and M12) and a high potential power supply VDD2. A positive polarity reference voltage V11 is applied to a gate of NMOS transistor M12, i.e., a non-inverting input terminal of the Nch differential pair (M11 and M12). A gate of NMOS transistor M11, i.e., an inverting input terminal of the Nch differential pair is connected to an output terminal N11 of the amplifier.

An amplifier stage of the positive polarity amplifier 210 includes an amplification transistor for charging M16 and an amplification transistor for discharging M18. The amplification transistor for charging M16 is connected between the high potential power supply VDD2 and the amplifier output terminal N11 and has a gate connected to an input end of the Pch current mirror (M13, M14), i.e., to a connection node between M12 and M14. The amplification transistor for discharging M18 is connected between the amplifier output terminal N11 and a intermediate voltage source VDD1.

The intermediate stage of the positive polarity amplifier 210 includes floating current sources M51 and M52 and current sources M53 and M54. The floating current source 51 includes a Pch transistor M51 that has gate supplied with the bias voltage BP1, has a source connected to the gate N13 of the amplification transistor M16 and has a drain connected to the gate terminal N15 of the amplification transistor M18. The floating current source M52 includes an Nch transistor M52 that has a gate supplied with a bias voltage BN1, has a drain connected to a gate terminal N13 of the amplification transistor M16 and has a source connected to a gate terminal N15 of the amplification transistor M18. The current source M53 is connected between a high voltage source VDD2 and the gate terminal N13 of the amplification transistor M16. The current source M54 is connected between the intermediate voltage source VDD1 and the gate terminal N15 of the amplification transistor M18. The sum current of the floating current sources M51 and M52 is set at a current approximately equal to each of the currents of the current sources M53 and M54.

A negative polarity amplifier 220 includes a differential input stage, an intermediate stage and an output stage. The differential input stage of the negative polarity amplifier 220 includes a current source M25 that has a first terminal connected to the high voltage source VDD2, and a Pch differential pair (M21 and M22) that has coupled sources connected to the second terminal of the current source M25, and an Nch current mirror (M23 and M24) connected between an output pair of the Nch differential pair (M21 and M22) and the low potential power supply VSS. A negative polarity reference voltage V21 is applied to a gate of the transistor M22, i.e., a non-inverting input terminal of the Pch differential pair (M21, M22). A gate of the transistor M21, i.e., an inverting input terminal of the Nch differential pair (the gate of M21) is connected to an output terminal N12 of the amplifier.

An amplifier stage of the negative polarity amplifier 220 includes an amplification transistor for discharging M26 and an amplification transistor for charging M28. The amplification transistor for discharging M26 is connected between the amplifier output terminal N12 and the low potential power supply VSS and has a gate connected to an input end (connection node of transistors M22 and M24) of the Nch current mirror (M23 and M24). The amplification transistor for charging M28 is connected between the intermediate voltage source VDD1 and the amplifier output terminal N12.

The intermediate stage of the negative polarity amplifier 220 includes floating current sources M61 and M62 and current sources M63 and M64. The floating current source 61 includes a Pch transistor M61 that has a gate supplied with the bias voltage BP2, has a drain connected to the gate terminal N14 of the amplification transistor M26 and has a source connected to the gate terminal N16 of the amplification transistor M28. The floating current source M62 includes an Nch transistor M62 that has a gate supplied with a bias voltage BN2, has a source connected to the gate terminal N14 of the amplification transistor M26 and has a drain connected to the gate terminal N16 of the amplification transistor M28. The current source M63 is connected between the intermediate voltage source VDD1 and the gate terminal N16 of the amplification transistor M28. The current source M64 is connected between a gate node N14 of the amplification transistor M26 and the low voltage source VSS. The sum current of the floating current sources M61 and M62 is set as a current approximately equal to each of the currents of the current sources M63 and M64.

The potential difference between the power supply voltages of the intermediate stage and the output stage of each of the positive polarity amplifier 210 and the negative polarity amplifier 220 is set to one-half of the potential difference of the power supply voltages of differential units 210A and 220A, respectively.

Since the major portion of current consumed in each of the positive polarity amplifier 210 and the negative polarity amplifier 220 flows through the output stage, the power consumption may be reduced to about one-half.

The arrangement of FIG. 9 also is a half-VDD amplifier. As compared to the power supply voltage range VDD2 to VSS of the differential stage of the positive polarity amplifier 210, the power supply voltage range VDD2 to VDD1 of the differential stage of the positive polarity amplifier is rather small. For example, VDD1=VDD2/2.

In the related art shown in FIG. 9, there is provided an auxiliary transistor M31 which operate to clamp the gate voltage of the output stage PMOS transistor M16 at VDD1 so that gate potential of the output stage PMOS transistor M16 will not be lower than VDD1. The reason for providing such auxiliary transistor M31 is that, since the withstand voltage of component elements of the output stage of the positive polarity amplifier 210 is to be lowered in correspondence with the power supply voltage range VDD2 to VDD1, a voltage beyond the withstand voltage is not to be applied to the elements. The auxiliary transistor M31 is connected between the gate of the PMOS transistor M16 and the power supply voltage VDD2, and has a gate supplied with a bias voltage VBN. There is also provided an auxiliary transistor M41 which operate to clamp the gate voltage of the output stage NMOS transistor M26 at VDD1 so that the gate potential of the output stage NMOS transistor will not be higher than VDD1. The reason for providing such auxiliary transistor M41 is that, since the withstand voltage of the component elements of the output stage of the negative polarity amplifier 220 is to be lowered in correspondence with the power supply voltage range VDD1 to VSS, a voltage beyond the withstand voltage is not to be applied to the elements. The auxiliary transistor M41 is connected between the gate of the output stage NMOS transistor M26 and the power supply VSS, and has a gate supplied with a bias voltage VBP.

[Patent Document 1] JP Patent Kokai Publication No. JP-P2009-244830A (FIG. 6)

[Patent Document 2] JP Patent Kokai Publication No. JP-P2008-116654A (FIG. 4)

SUMMARY

The following is an analysis of the related art.

In the related art shown in FIG. 8, in which it is supposed that a heavy load, such as a data line with a large capacitive load, is to be driven at a high speed (column inversion driving), when a positive polarity input voltage is changed from the vicinity of the power supply VDD (charging operation) to the vicinity of the power supply VML (discharging operation), there is caused a time delay until gate voltages of the output transistors MP18 and MN18 of the output stage 13, which appreciably have lowered during the charging operation, revert to a voltage at which changing over from charging operation to the discharging operation occurs. Hence, there is caused a delay in an output signal voltage. In similar manner, when a negative polarity input voltage is changed from the vicinity of the power supply VSS (discharging operation) to the vicinity of the power supply VMH (charging operation), there is caused a delay until gate voltages of the output transistors MP28 and MN28 of the output stage 23, appreciably raised during the discharging operation, revert to a voltage at which changing over from the discharging operation to the charging operation occurs. There is thus similarly caused a delay in the output signal voltage.

In the related art of FIG. 9, when the auxiliary transistor M31 of the positive polarity amplifier 210 performs a clamping operation, a current flows, apart from an idling current of the positive polarity amplifier 210, from the high potential power supply VDD2 to the gate N13 of the amplification transistor M16, by the auxiliary transistor M31, thus increasing power consumption. Additionally, when the auxiliary transistor M41 of the negative polarity amplifier 220 performs a clamping operation, a current flows, apart from the idling current of the negative polarity amplifier 220, from the gate N14 to the low potential power supply VSS by the auxiliary transistor M41, thus increasing power consumption.

In view of the above mentioned problems of the related arts, it is an object of the present invention to provide an output circuit that can avoid a delay in an output signal voltage and that can suppress an increase in current consumption, and a data driver as well as a display apparatus having the output circuit.

The present invention, aimed to solve at least one of the above mentioned problems, is designed and arranged substantially as follows, but non-limited thereto:

In accordance with an aspect of the present invention, there is provided an output circuit comprising: an input terminal; an output terminal; first, second and third power supply terminals supplied with first, second and third power supply voltages from first, second and third power supplies, respectively, the third power supply voltage being a voltage intermediate between the first and second power supply voltages; a differential amplifier circuit; an output amplifier circuit; and a control circuit.

The differential amplifier circuit that includes:

a differential input stage that differentially receives an input signal at the input terminal and an output signal at the output terminal;

a first current mirror that includes a pair of transistors of a first conductivity type connected to the first power supply terminal;

a second current mirror that includes a pair of transistors of a second conductivity type connected to the second power supply terminal, at least one of the first and second current mirrors receiving an output current of the differential input stage;

a first junction circuit connected between respective input nodes of the first and second current mirrors; and a second junction circuit connected between respective output nodes of the first and second current mirrors.

The output amplifier circuit includes:

a first transistor of the first conductivity type that is connected between the first power supply terminal and the output terminal, and has a control terminal connected to a connection node between an output node of the first current mirror and one end of the second junction circuit; and a second transistor of the second conductivity type that is connected between the output terminal and the third power supply terminal and has a control terminal connected to the other end of the second junction circuit.

The control circuit includes a third transistor of the first conductivity type that has a first terminal connected to a connection node between the other end of the second junction circuit and the control terminal of the second transistor of the output amplifier circuit, has a second terminal connected to the output node of the second current mirror and has a control terminal supplied with a first bias voltage having a value in accordance with the third power supply voltage.

An output circuit according to the present invention may comprise a bias circuit that including: a fourth transistor of a first conductivity type that has a first terminal connected to the third power supply terminal and has a second terminal and a control terminal coupled together; and a load element connected between the second terminal of the fourth transistor and the second power supply terminal, a voltage at the second terminal of the fourth transistor being supplied as the first bias voltage to the control terminal of the third transistor of the first conductivity type.

According to the present invention, there may be implemented an output circuit adapted to avoid a delay in an output signal voltage, as well as to suppress increase in current consumption, a data driver including the output circuit, and a display apparatus.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
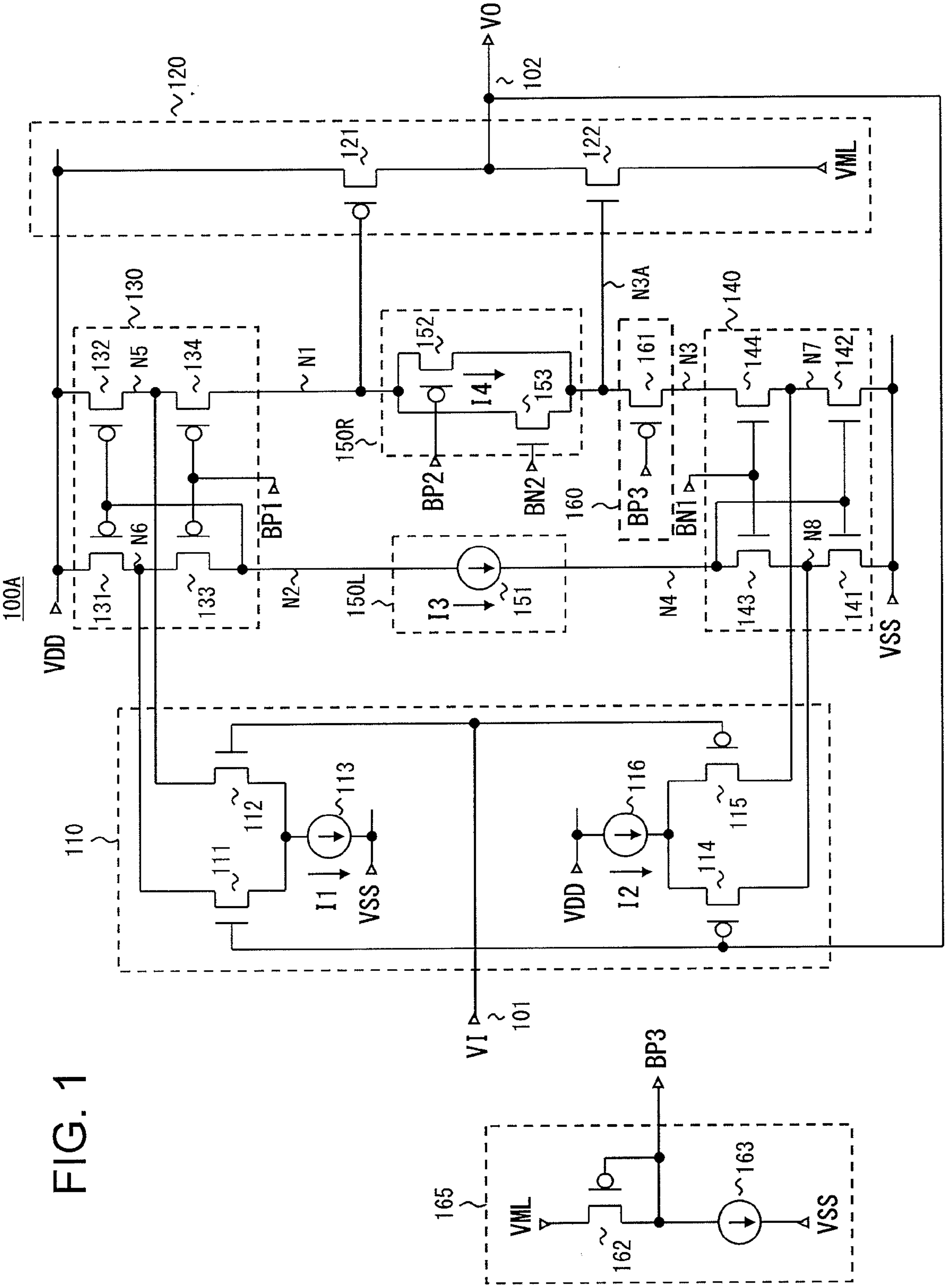
FIG. 1 is a circuit diagram showing a configuration of a first exemplary embodiment of the present invention.

An output circuit according to the present invention includes a differential amplifier circuit, an output amplifier circuit (120), a control circuit (160), an input terminal (101), an output terminal (102), and first, second, and third power supply terminals (VDD, VSS, VML) supplied respectively with first to third power supply voltages. The third power supply voltage (VML) is set to a potential intermediate between the first and second power supply voltages (VDD, VSS).

The differential amplifier circuit includes a differential input stage (110) that differentially receives an input signal (VI) at the input terminal (101) and an output signal (VO) at the output terminal (102), first and second current mirrors (130, 140), respectively connected to the first and second power supplies (VDD, VSS). At least one of the first and second current mirrors (130, 140) receives an output current of the differential input stage (110). The differential amplifier circuit further includes a first junction circuit (150L) connected between input nodes of the first and second current mirrors (130, 140), and a second junction circuit (150R) connected between output nodes of the first and second current mirrors (130, 140).

The output amplifier circuit includes a first transistor of a first conductivity type (121) connected between the first power supply terminal (VDD) and the output terminal (102), The control terminal of the first transistor is connected to a connection node between the output node of the first current mirror (130) and one end of the second junction circuit (150R). The output amplifier circuit also includes a second transistor of a second conductivity type (122) connected between the third power supply terminal (VML) and the output terminal (102). The control terminal of the second transistor is connected to the other end of the second junction circuit (150R).

The control circuit (160) includes a third transistor of the first conductivity type (161) connected between the output node of the second current mirror (140) and the other end of the second junction circuit (150R). The third transistor receives a bias voltage (BP3) which has a voltage in accordance with the voltage at the third power supply terminal (VML).

There may also be provided a bias circuit (165) including a fourth transistor (162) of the first conductivity type that has a first terminal connected to the third power supply terminal (VML) and has second and control terminals coupled together, and a load element (163) connected between the second terminal of the fourth transistor (162) and the second power supply (VSS). The bias circuit (165) provides a voltage at the second terminal of the fourth transistor (162) as the bias signal (BP3). The present invention will now be described with reference to exemplary embodiments.

Exemplary Embodiment 1

Figure 8:
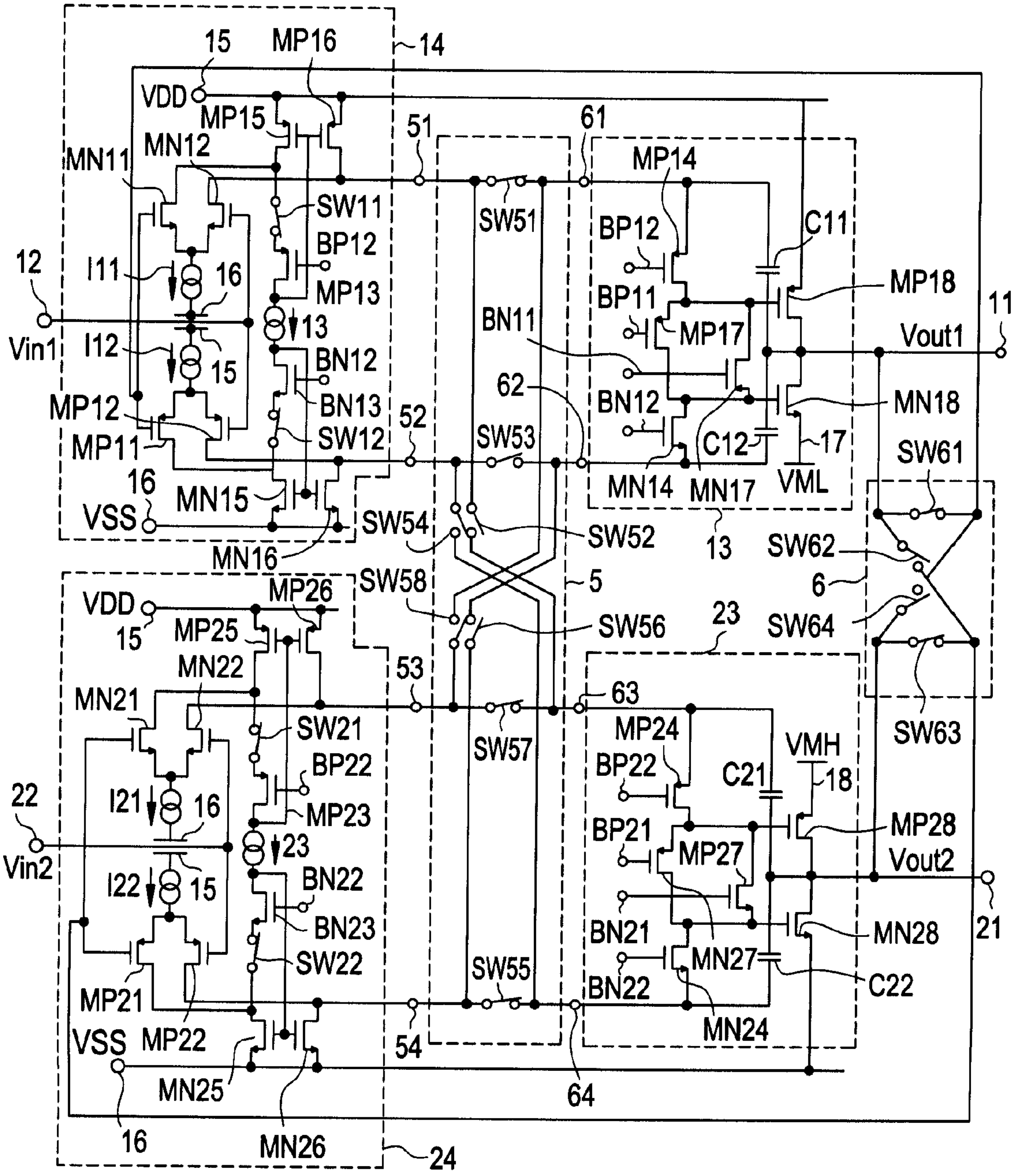
FIG. 8 PRIOR ART
FIG. 8 is a circuit diagram corresponding to FIG. 6 of Patent Document 1.

FIG. 1 shows an arrangement of an output circuit according to a first exemplary embodiment of the present invention. The arrangement of FIG. 1 corresponds to a positive polarity driving amplifier of FIG. 8 (14 and 13 of FIG. 8). Referring to FIG. 1, the output circuit of the present exemplary embodiment includes a differential amplifier circuit, an output amplifier circuit, a first control circuit, an input terminal, an output terminal, and power supply terminals of first to third power supplies VDD, VSS and VML. The power supply terminal VML is supplied with a voltage intermediate between VDD and VSS.

In the present exemplary embodiment, the differential amplifier circuit includes an input differential stage 110 including a constant current source 113 that has one end connected to a VSS power supply terminal, and an Nch differential pair including NMOS transistors 112 and 111 that have gates connected respectively to an input terminal 101 and to an output terminal 102 and having coupled sources connected to the other end of the constant current source 113. The input differential stage 110 also includes another constant current source 116 that has one end connected to a VDD power supply terminal, and a Pch differential pair including PMOS transistors 115 and 114 that have gates connected respectively to the input terminal 101 and to the output terminal 102 and have coupled sources connected to the other end of the constant current source 116.

The differential amplifier circuit also includes a first current mirror 130 including PMOS transistors 131 and 132 that have sources connected in common to a VDD power supply terminal and have coupled gates and PMOS transistors 133 and 134 that have sources connected respectively to the drains of the PMOS transistors 131 and 132 and have gates coupled together and supplied with a first bias voltage BP1. The drain of the PMOS transistor 133 is connected to the coupled gates of the PMOS transistors 131 and 132.

The differential amplifier circuit also includes a second current mirror 140 including NMOS transistors 141 and 142 that have sources connected in common to a VSS power supply terminal and have gates coupled together, and NMOS transistors 143 and 144 that have sources connected respectively to the drains of the NMOS transistors 141 and 142 and have gates coupled together and supplied with a second bias voltage BN1. The drain of the NMOS transistor 143 is connected to the coupled gates of the NMOS transistors 141 and 142. The drains of the NMOS transistors 111 and 112, forming a pair of output nodes of the Nch differential pair, are connected respectively to a connection node N6 of the PMOS transistors 131 and 133 and to a connection node N5 of the PMOS transistors 132 and 134. The drains of the PMOS transistors 114 and 115, forming a pair of outputs of the Pch differential pair, are connected respectively to a connection node N8 of the NMOS transistors 141 and 143 and to a connection node N7 of the NMOS transistors 142 and 144.

In the present exemplary embodiment, the differential amplifier circuit further includes a first junction circuit 150L, including a current source 151 connected between a drain node of the PMOS transistor 133, forming an input node N2 of the first current mirror 130, and a drain node of the NMOS transistor 143, forming an input node N4 of the second current mirror 140, and a second junction circuit 150R, including a PMOS transistor 152 and an NMOS transistor 153 that are connected in parallel to each other between a drain node of the PMOS transistor 134, forming an output node N1 of the first current mirror 130, and a drain node of the NMOS transistor 144, forming an output node N3 of the second current mirror 140. The gates of the PMOS transistor 152 and the NMOS transistor 153 are supplied with third and fourth bias voltages BP2 and BN2, respectively.

In the present exemplary embodiment, an output amplifier circuit 120 includes a PMOS transistor 121 that is connected between the VDD power supply terminal and the output terminal 102, and has a gate connected to a connection node between the output node N1 of the first current mirror 130 and one end of the second junction circuit 150R, and an NMOS transistor 122 that is connected between a VML power supply terminal and the output terminal 102 and has a gate connected to the other end N3A of the second junction circuit 150R.

In the present exemplary embodiment, there is further provided a control circuit 160 including a PMOS transistor 161 that has a source connected to the connection node N3A between the other end of the second junction circuit 150R and the gate of the NMOS transistor 122 that has a drain connected to an output node N3 of the second current mirror 140. The gate of the PMOS transistor 161 is supplied with a fifth bias signal BP3 which has a voltage determined in accordance with the voltage of the VML power supply terminal.

In the present exemplary embodiment, there is further provided a bias circuit 165 including a PMOS transistor 162 and a load element 163. The PMOS transistor 162 has a source connected to the VML power supply terminal and has a drain and a gate coupled together. That is, the PMOS transistor 162 is diode-connected. The load element 163 is connected between the drain of the PMOS transistor 162 and the VSS power supply terminal. The bias circuit supplies the drain voltage of the PMOS transistor 162 as the fifth bias signal BP3. Although the load element 163 is configured by a current source, it may also be a transistor or a resistance element.

In the present exemplary embodiment, the sole bias circuit 165 is provided for a plurality of output circuits 100A. The bias circuit supplies the bias voltages BP3 to the control circuits 160 of a plurality of output circuits 100A in common.

The power supply voltage range of the output amplifier circuit 120 is set to VDD to VML against the power supply voltage range VDD to VSS of the differential amplifier circuit. For example, VML=VDD/2.

The bias voltage BP3, output from the bias circuit 165, is to be a voltage lower than VML by ca. an absolute threshold value of the PMOS transistor 162 (|Vtp|).

In FIG. 1, the first and second current mirrors 130, 140 are in a low voltage cascoded current mirror configuration. However, they may also be in a single-stage current mirror configuration. This single-stage current mirror configuration will be described later as another exemplary embodiment.

When in driving a heavy capacitive load, such as a data line of a large size liquid crystal display apparatus, at a high speed (column inversion driving), a positive polarity input voltage in the vicinity of the power supply VDD is inputted (charging at the output terminal 102), the gate potentials of the PMOS transistor 121 and the NMOS transistor 122 are lowered due to increase in the output current of the second current mirror 140.

When the gate potential N3A of the NMOS transistor 122 of the output amplifier circuit 120 is going to be lowered further from VML, that is, when the source potential of the PMOS transistor 161 is going to be lowered to VML or less, the PMOS transistor 161 is turned off, if the gate-to-source voltage of the PMOS transistor 161 has become less than its threshold voltage. The current path between VDD and VSS, that is, the current path including PMOS transistors 132 and 134, second junction circuit 150R, PMOS transistor 161 and the NMOS transistors 144 and 142, is cut off, so that the node N3A is held in the vicinity of VML. That is, the node 3A is not lowered to VML or less. The gate potential of the PMOS transistor 121 of the output amplifier circuit 120 also is not lowered to VML or less.

When, in this state, a positive polarity input voltage in the vicinity of the power supply voltage VML is inputted (discharging at the output terminal 102), the gate node N1 of the PMOS transistor 121 of the output amplifier circuit 120 is quickly raised to a voltage (VDD−|Vtp|) which is a voltage when an output is in a stabilized state. The gate node N3A of the NMOS transistor 122 also quickly is raised to a voltage (VML+Vtn) which is a voltage when the output is in a stabilized state. The voltages at the nodes N1 and N3A further continue to be raised. The PMOS transistor 121 is turned off and the NMOS transistor 122 is turned on (rendered electrically conductive), discharging at the output terminal 102 to the vicinity of VML is started speedily. Thus, in the present exemplary embodiment, the gate voltages of the output stage transistors are not decreased to lower than VML, in contradistinction from the case of the related art shown in FIG. 8. Hence, the output signal is not delayed.

It is noted that the voltage at the node N3A, for which the PMOS transistor 161 of the control circuit 160 is turned off, is a voltage higher than the bias voltage BP3 of the bias circuit 165 by an absolute value of a threshold voltage (|Vtp|) of the PMOS transistor 161. Thus, if the threshold voltage of the PMOS transistor 162 of the bias circuit 165 is equal to the threshold voltage of the PMOS transistor 161 of the control circuit 160, the voltage at the node N3A, for which the PMOS transistor 161 is turned off (rendered electrically non-conductive), is VML or thereabouts. It is also possible to adjust the threshold voltages of the PMOS transistors 161 and 162 as necessary to shift from VML, the voltage at the node N3A for which the PMOS transistor 161 is turned off (rendered electrically non-conductive).

Figure 9:
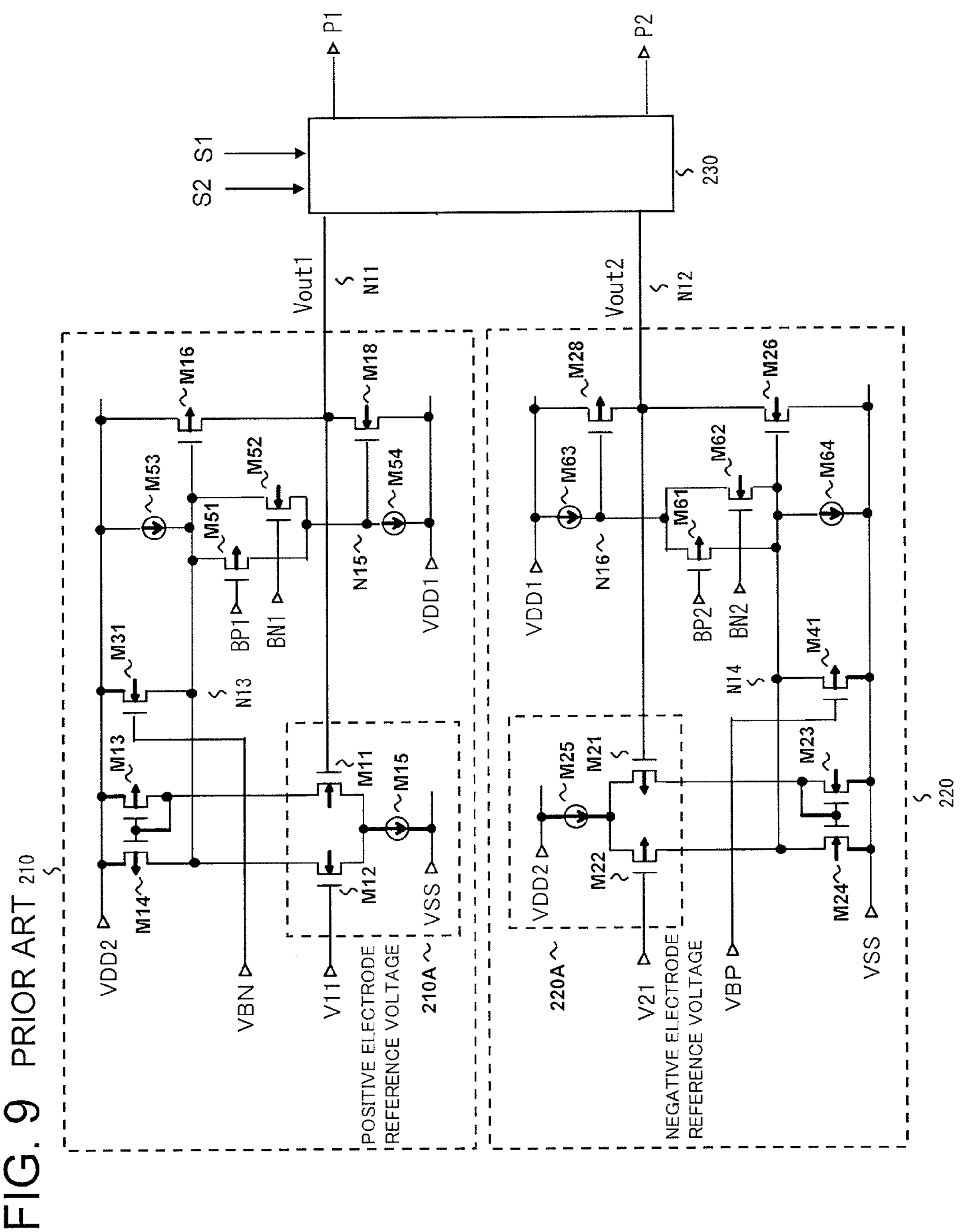
FIG. 9 PRIOR ART
FIG. 9 is a circuit diagram corresponding to FIG. 4 of Patent Document 2.

In the present exemplary embodiment, the PMOS transistor 161 is connected in a current path between the output node N3 of the second current mirror 140 and the second junction circuit 150R. When the PMOS transistor 161 is off (electrically non-conductive), the current path is cut off, so that the gate voltage of the NMOS transistor 122 is maintained at or near VML. Thus, in the present exemplary embodiment, there is caused no such problem as increased power consumption, as is the case with the related art shown in FIG. 9.

In the present exemplary embodiment, when the gate potential of the NMOS transistor 122 is higher than VML, the PMOS transistor 161 is in an on state (electrically conductive), thus not affecting the normal amplifier operation.

Exemplary Embodiment 2

Figure 2:
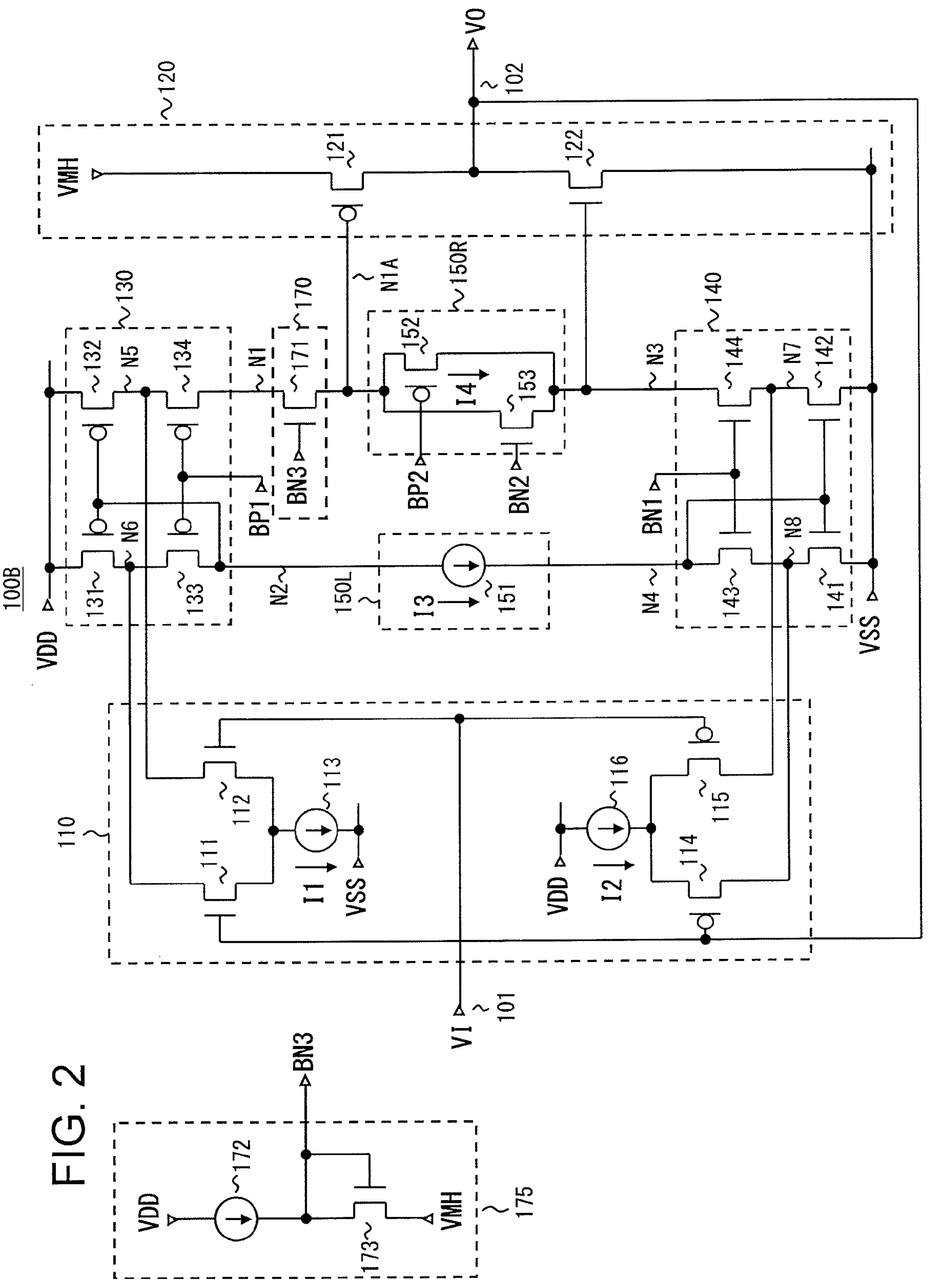
FIG. 2 is a circuit diagram showing a configuration of a second exemplary embodiment of the present invention.

FIG. 2 shows a configuration of a second exemplary embodiment of the present invention. The configuration of FIG. 2 corresponds to the negative polarity driving amplifier of FIG. 8 (24, 23).

Referring to FIG. 2, showing an output circuit 100B of the present exemplary embodiment, an input differential stage 110, first and second current mirrors 130 and 140 and the first and second junction circuit 150L and 150R are the same as those of the first exemplary embodiment. An output amplifier circuit 120 includes a PMOS transistor 121 and an NMOS transistor 122. The PMOS transistor 121 has a source connected to a VMH power supply terminal, fed with an intermediate power supply voltage VMH, has a gate connected to one end of the second junction circuit 150R and has a drain connected to an output terminal 102. The NMOS transistor 122 has a source connected to the VSS power supply terminal, has a gate connected to the other end of the second junction circuit 150R and has a drain connected to the output terminal 102.

The output circuit 100B of the present exemplary embodiment includes a control circuit 170 in place of the control circuit 160 of the exemplary embodiment 1 described above. The control circuit 160 of the first exemplary embodiment is made up of the PMOS transistor 161 connected between the other end N3A of the second junction circuit 150R and the output node N3 of the second current mirror 140. In contrast, the control circuit 170 of the present exemplary embodiment includes an NMOS transistor 171 that has a drain connected to an output node N1 of a first current mirror 130, has a source connected to a connection node N1A between one end of the second junction circuit 150R and the gate of a PMOS transistor 121 and has a gate supplied with a bias voltage BN3.

In the present output circuit 100B, a bias circuit 175 includes an NMOS transistor 173 and a load element 172. The NMOS transistor 173 has a source connected to VMH, and has a drain and a gate coupled together. The load element 172 is connected between the drain of the NMOS transistor 173 and the power supply VDD. The bias circuit 175 provides a voltage at the drain of the NMOS transistor 173 as the bias voltage BN3.

When a heavy capacitive load, such as a data line of the large picture image size display apparatus, is to be driven by at a high speed (column inversion driving), and a negative polarity input voltage in the vicinity of the power supply voltage VSS is inputted (discharging at the output terminal 102). In such a case, the gate potential of the PMOS transistor 121 and that of the NMOS transistor 122 are raised by increase in the output current of the first current mirror 130.

When the gate potential N1A of the transistor 122 of the output amplifier circuit 120 is going to be raised beyond VMH, that is, the source potential of the NMOS transistor 171 is going to be raised beyond VMH, the NMOS transistor 171 is turned off, if the gate-to-source voltage of the NMOS transistor 171 is less than its threshold voltage. The current path between VDD and VSS, that is, the current path composed of the PMOS transistors 132 and 134, second junction circuit 150R, PMOS transistor 161 and the NMOS transistors

144 and 142, is cut off to hold the node N1A at or near VMH. That is, the voltage at the node N1A is not raised to VMH or more. The gate potential of the NMOS transistor 122 of the output amplifier circuit 120 is not raised to VMH or more.

When, in this state, a negative polarity input voltage in the vicinity of the power supply VMH is inputted (charging at the output terminal 102), the gate node N3 of the NMOS transistor 122 of the output amplifier circuit 120 is lowered quickly to a voltage (VSS+Vtn) which is a voltage when the output is in a stabilized state and the gate node N1A of the PMOS transistor 121 is lowered quickly to a voltage (VMH−|Vtp|) which is a voltage when the output is in a stabilized state. The nodes N1A and N3 continue to be lowered. The NMOS transistor 122 and the PMOS transistor 121 are turned off and on, respectively, to speedily start charging the output terminal 102 to VMH or its vicinity. The gate voltage of the output stage transistor is not raised higher than VMH, as is the case with the related art of FIG. 8, so that delay in the output signal can be avoided.

It is noted that the voltage at the node N1A for which the NMOS transistor 171 of the control circuit 170 is turned off (rendered electrically non-conductive) is a voltage lower than the bias voltage BN3 of the bias circuit 175 by the threshold voltage (Vtn) of the NMOS transistor 171. Thus, in case the threshold voltage of the NMOS transistor 173 of the bias circuit 175 is equal to that of the NMOS transistor 171 of the control circuit 170, the voltage at the node N1A, for which the NMOS transistor 171 is turned off, is VMH or thereabouts. It is also possible to adjust the threshold voltages of the NMOS transistors 171 and 173 as necessary to shift from VMH the voltage at the node N1A for which the NMOS transistor 171 is turned off.

In the present exemplary embodiment, the NMOS transistor 171 is provided on a current path between the output node N1 of the first current mirror 130 and the second junction circuit 150R. Thus, when the NMOS transistor 171 is turned off (rendered electrically non-conductive), the current path is cut off, so that the gate voltage of the PMOS transistor 121 is held at or near VMH. In the present exemplary embodiment, thus increase in power consumption can be avoided in contradistinction from the related art shown in FIG. 9.

In the present exemplary embodiment, when the gate potential of the PMOS transistor 121 is lower than VMH, the NMOS transistor 171 is in an on state (electrically conductive), thus not affecting the normal amplifier operation.

Exemplary Embodiment 3

Figure 3:
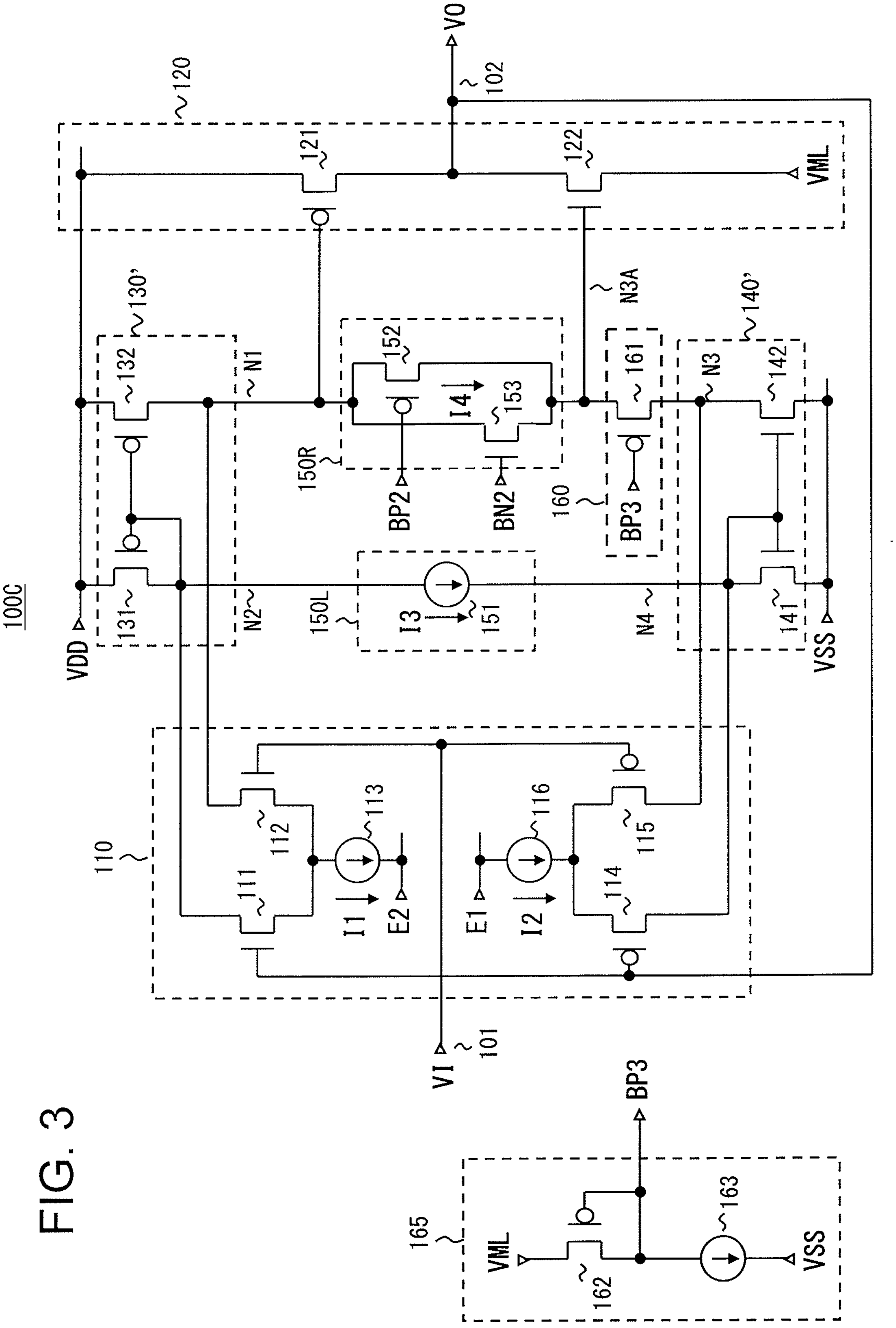
FIG. 3 is a circuit diagram showing a configuration of a third exemplary embodiment of the present invention.

FIG. 3 shows an arrangement of an exemplary embodiment 3 of the present invention. Referring to FIG. 3, in an output circuit 100C of the present exemplary embodiment, each of the first and second current mirrors 130 and 140 in the output circuit 100A of the exemplary embodiment 1 of FIG. 1 (low voltage cascoded current mirror), is configured by a single-stage current mirror.

Referring to FIG. 3, a first current mirror 130' includes PMOS transistors 131 and 132 that have sources connected in common to the power supply VDD and have gates coupled together. The drain and the gate of the transistor 131 are coupled together. A second current mirror 140' includes PMOS transistors 141 and 142 that have sources connected in common to the power supply VSS and have gates coupled together. The drain and the gate of the transistor 141 are coupled together. A control circuit 160 includes a PMOS transistor 161 that has a source connected to a connection node of the second junction circuit 150R and the gate of the NMOS transistor 122, has a drain connected to an output node N3 of the second current mirror 140' (drain of an NMOS transistor 142), and has a gate supplied with the bias voltage BP3 from a bias circuit 165. The bias circuit 165 is similar in configuration to the corresponding element of the first exemplary embodiment. In the present exemplary embodiment, the operation or the meritorious effect, similar to that of the exemplary embodiment 1, may be derived.

Exemplary Embodiment 4

Figure 4:
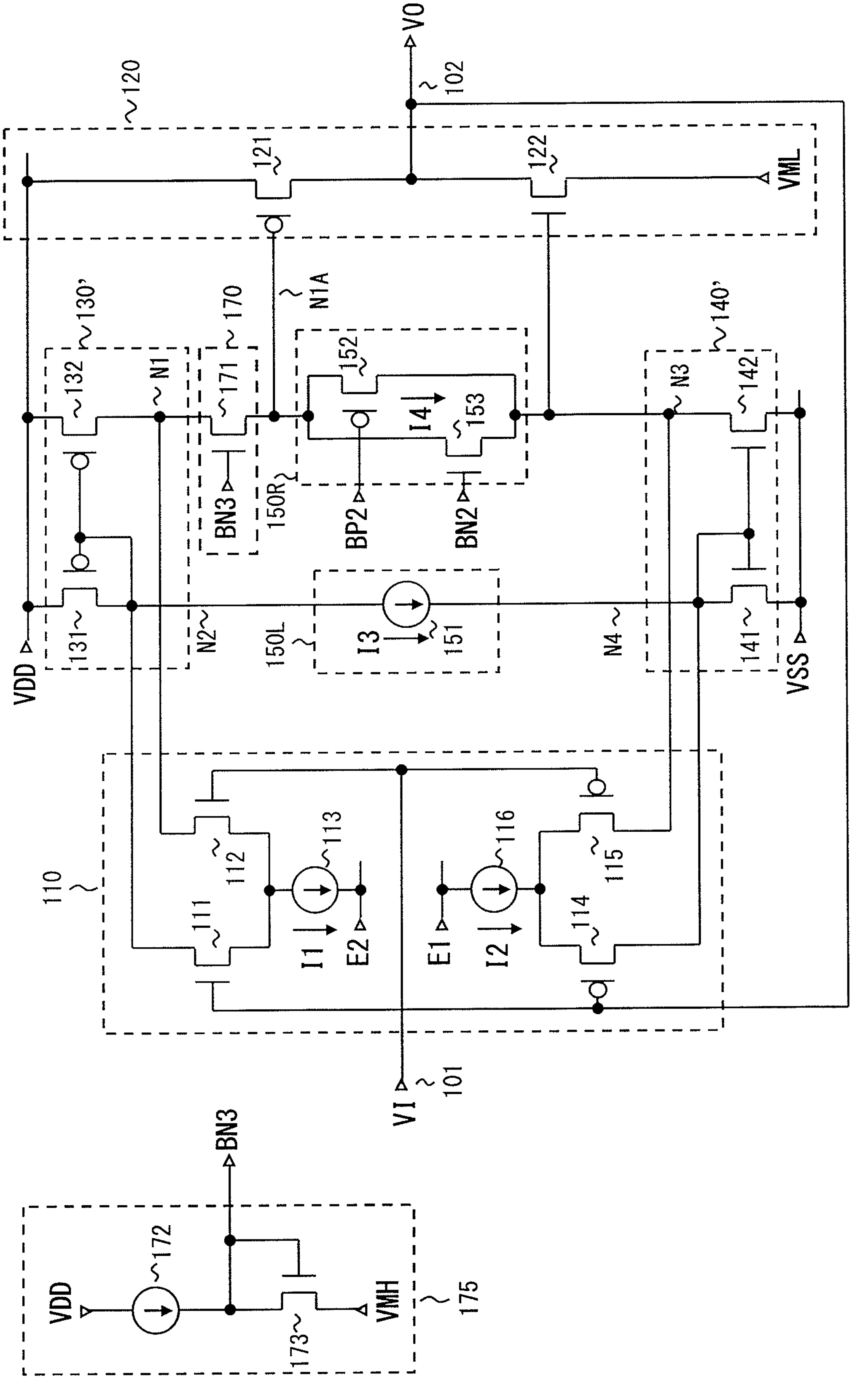
FIG. 4 is a circuit diagram showing a configuration of a fourth exemplary embodiment of the present invention.

FIG. 4 shows an arrangement of an exemplary embodiment 4 of the present invention. Referring to FIG. 4, in an output circuit 100D of the present exemplary embodiment, the first and second current mirrors 130 and 140 in the output circuit 100B of the exemplary embodiment 1 of FIG. 2 (low voltage cascoded current mirror) in the output circuit 100B of FIG. 2 is configured by a single-stage current mirror.

Referring to FIG. 4, a first current mirror 130' includes PMOS transistors 131 and 132 that have sources connected in common to the power supply VDD and have gates coupled together. The drain and the gate of the PMOS transistor 131 are coupled together. A second current mirror 140' includes PMOS transistors 141 and 142 that haves sources connected in common to the power supply VSS and have gates coupled together. The drain and the gate of the PMOS transistor 141 are coupled together. A control circuit 170 includes an NMOS transistor 171 that has a source connected to a connection node between the second junction circuit 150R and the gate of the PMOS transistor 121, has a drain connected to an output node N1 of the first current mirror 130' (to the drain of the PMOS transistor 132), and has a gate supplied with the bias voltage BN3 of the bias circuit 175. The bias circuit 175 is similar in configuration to the corresponding element of the second exemplary embodiment. In the present exemplary embodiment, the operation or the meritorious effect, similar to that of the second exemplary embodiment, may be derived.

EXAMPLE

Figure 5A:
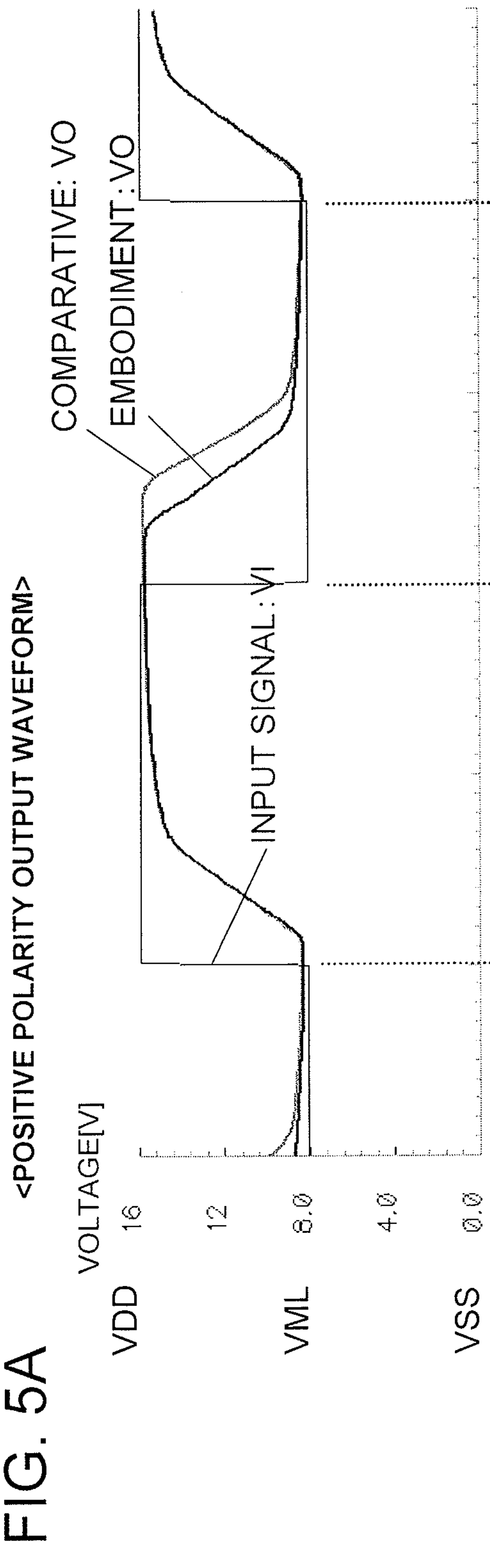
FIGS. 5A and 5B are waveform diagrams showing simulation waveforms of the first exemplary embodiment and a comparative example.
Figure 5B:
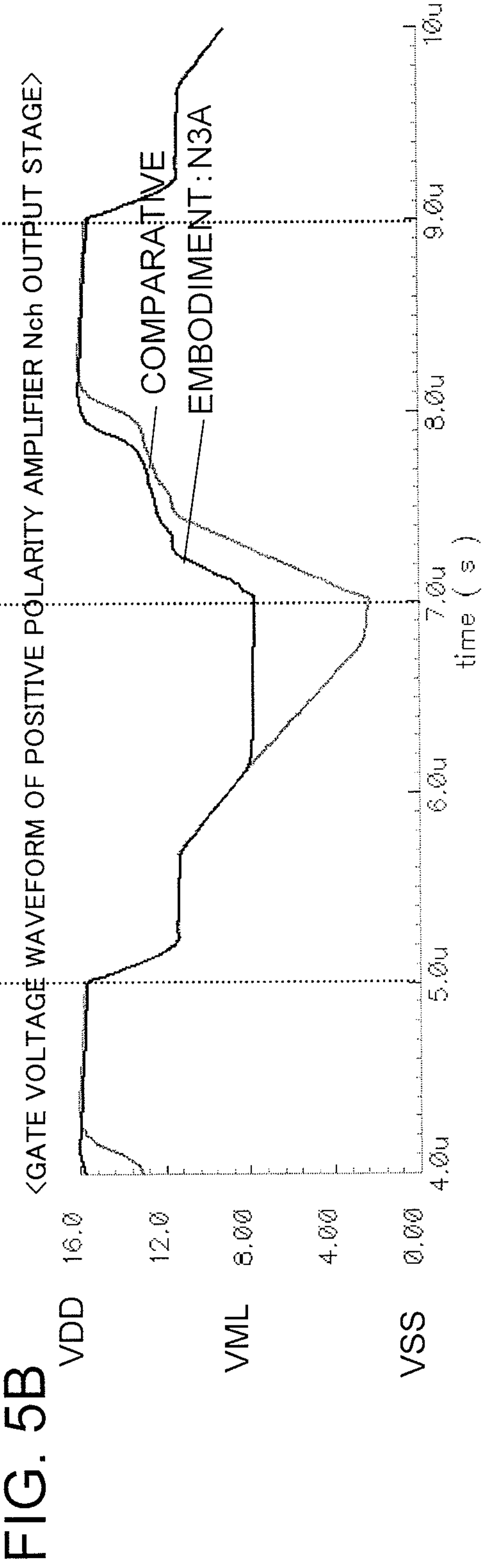

The following describes the result of circuit simulation of the first exemplary embodiment of FIG. 1. A waveform diagram of FIGS. 5A and 5B shows the result of circuit simulation (transient analysis) of the arrangement of FIG. 1 and, by way of Comparative Example, the result of circuit simulation (transient analysis) of the arrangement of the related art of FIG. 8. More specifically, FIG. 5A shows output voltage waveforms at the time of driving a heavy capacitive line load of the output circuit of the related art (comparative) and that of the first exemplary embodiment. FIG. 5B shows gate voltage waveforms of the NMOS transistors of the output stages of the related art and those of the first exemplary embodiment of the embodiment (NMOS transistor MN18 of FIG. 8 and the NMOS transistor 122 of FIG. 1).

FIG. 5A shows a voltage waveform of an output signal of the output circuit at the connection node with an end of a wiring capacitive load for a positive polarity input signal in case wiring capacitive load is AC driven in a positive polarity power supply voltage range of VDD (16V) to VML (8V), for each of the related art (comparative case) and the exemplary embodiment. The positive polarity input signal is a step signal with an amplitude of 8.0V. When the positive polarity input signal falls from VDD (16V) to VML (8V) or its vicinity, the output signal VO of the related art suffers significant time delay. Conversely, the delay of the output signal VO of the exemplary embodiment is suppressed.

When the positive polarity input signal assumes high voltage side power supply voltage VDD, as shown in FIG. 5B, in the related art, the gate voltage of the NMOS transistor (MN18 of FIG. 8) falls to a value lower than the intermediate power supply voltage VML (8V), for example, to 3.2V or thereabouts. If, in this state, the positive polarity input signal falls from near VDD to near VML, it takes some time until the gate voltage of the NMOS transistor of the output stage (MN18 of FIG. 8) rises from near 3.2V to surpass VML (8V) to get to (VML+Vtn) to cause the NMOS transistor (MN18 of FIG. 8) of the output stage to be turned on. This produces a delay in the output signal as in the related art shown in FIG. 5A. Conversely, according to the exemplary embodiment, as the gate voltage of the NMOS transistor 122 (voltage at the node N3A) is about to fall to VML or less, the PMOS transistor 161 is turned off. Hence, the gate voltage of the NMOS transistor 122 is kept in the vicinity of VML. If, in this state, the input signal is changed (decreased) from near VDD to near VML, the gate voltage of the NMOS transistor 122 (voltage at the node N3A) rises from VML (8V) to quickly surpass (VML+Vtn) to turn on the NMOS transistor 122. That is, with the exemplary embodiment, the output signal is not delayed, in contradistinction from the case of the related art.

It is seen from FIGS. 5A and 5B that the first exemplary embodiment of FIG. 1 has the function of suppressing a delay in the output signal. In similar manner, the function of suppressing the delay in the output signal may be confirmed by simulation (not shown) in the exemplary embodiments of FIGS. 2 to 4.

Exemplary Embodiment 5

Figure 6:
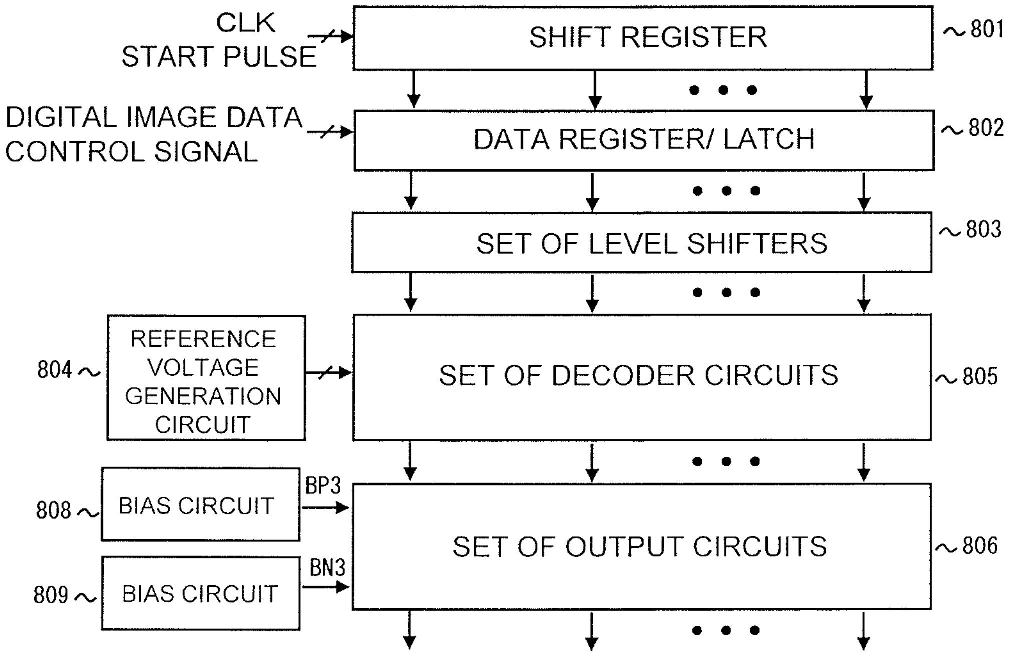
FIG. 6 is a block diagram showing a configuration of a fifth exemplary embodiment of the present invention.
Figure 7A:
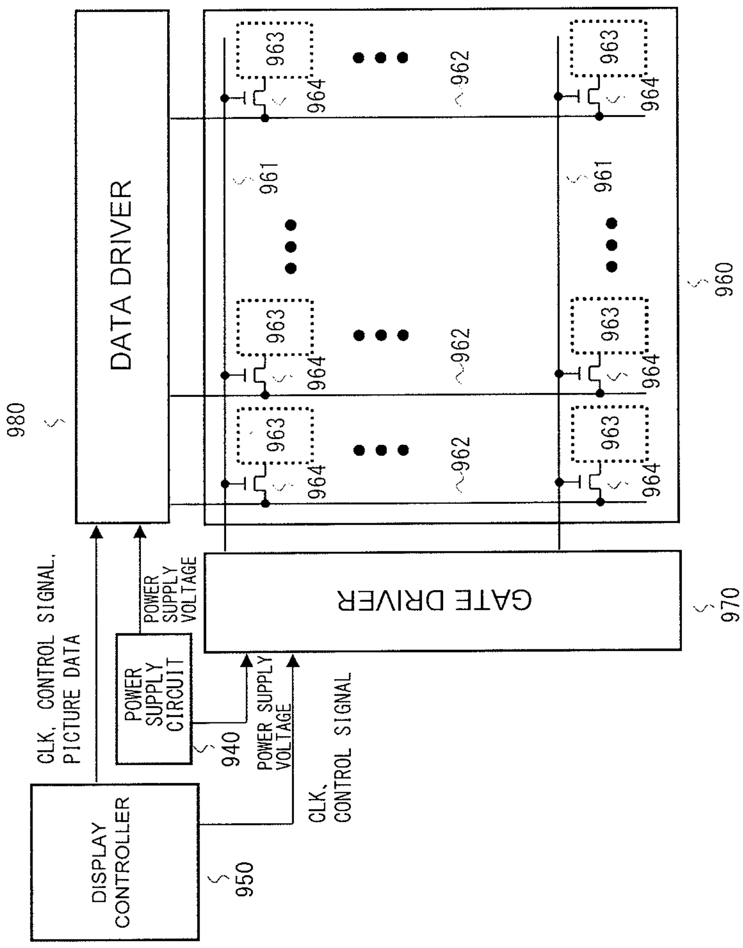
FIGS. 7A and 7B are diagrams showing a configuration of a liquid crystal display apparatus and that of a pixel.
Figure 7B:
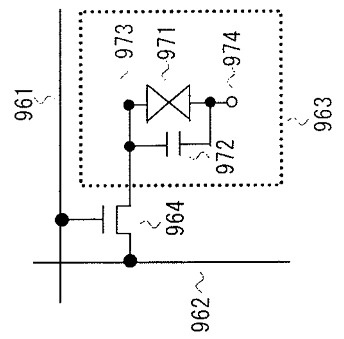

FIG. 6 is a diagram showing essential portions of a data driver of a display apparatus according to an fifth exemplary embodiment of the present invention. The data driver corresponds to a data driver 980 of FIG. 7A. Referring to FIG. 6, the data driver includes a shift register 801, a data register/latch 802, a set of level shifters 803, a reference voltage generation circuit 804, a set of decoders 805 and a set of output circuits 806.

As the output circuits of the output circuit set 806, any of the output circuits 100A to 100D of the exemplary embodiments, described above with reference to FIGS. 1 to 4, may be used. In an example shown in FIG. 6, a plurality of the output circuits, corresponding to the number of outputs, are provided. A bias circuit 808 corresponds to the bias circuit 165 of FIG. 1, and supplies the bias voltage BP3 to each of a plurality of the control circuits 160 of the output circuits that compose positive polarity driving amplifiers of the output circuits. A bias circuit 809 corresponds to the bias circuit 175 of FIG. 2, and supplies the bias voltage BN3 to each of a plurality of the control circuits 170 of the output circuits that compose the negative polarity driving amplifiers of the output circuits.

The shift register 801 determines data latch timing based upon a start pulse and the clock signal CLK. The data register/latch 802 expands the input image digital data, based upon the timing determined by the shift register 801, into digital data signals on a per output basis, and latches the signals every preset number of outputs, to output the latched signals to the set of level shifters 803 in response to a control signal. Each of the level shifters 803 converts the level of the digital signal, output from the data register/latch 802, on a per output basis, from a low amplitude signal into a high amplitude signal, to output the level-converted signal to an associated one of the decoders 805. Each of the decoders 805 selects one or more reference voltages, corresponding to the input digital data signal, from the set of reference voltages generated by the reference voltage generation circuit 804. Each of the output circuits 806 receives, on a per output basis, one or more reference voltages, selected by the corresponding decoder of the set of decoders 805, to output a gray scale signal corresponding to the one or more reference voltages received. Each of output terminals of the output circuits 806 is connected to an associated data line of the display apparatus. The shift register 801 and the data register/latch 802 are configured by logic circuits that operate under a low voltage (amplitude: 0-3.3V), supplied from a corresponding power supply. The level shifters 803, decoders 805 and output circuits 806 each operate with a high voltage necessary to drive display elements, such as 18V (amplitude: 0-18V), supplied from a corresponding power supply.

The output circuit of each of the exemplary embodiments, described above with reference to FIGS. 1 to 4, is suited for delay suppression during charging/discharging of a data line connected to the output terminal of the output circuit and to reduction of power consumption. Hence, the output circuit may be used to advantage as output circuits of the set of output circuits 806 of a data driver of the display apparatus.

In the exemplary embodiment, it is possible to implement a data driver as well as a display apparatus that may be driven at low power consumption at an elevated speed.

The disclosure of the aforementioned Patent Documents is incorporated by reference herein. The particular exemplary embodiments or examples may be modified or adjusted within the gamut of the entire disclosure of the present invention, inclusive of claims, based on the fundamental technical concept of the invention. For example, the current source used in the present invention may be configured by a transistor that has a source supplied with a preset power supply voltage and has a gate supplied with a preset bias voltage. Moreover, a variety of combinations or selection of elements disclosed herein may be made and included within the scope of the claims. The present invention may cover a wide variety of modifications or corrections that may occur to those skilled in the art in accordance with the entire disclosure of the present invention, inclusive of claim and the technical concept of the present invention.

What is claimed is:

1. An output circuit comprising:

an input terminal;

an output terminal;

first, second and third power supply terminals supplied with first, second and third power supply voltages from first, second and third power supplies, respectively, said third power supply voltage being a voltage intermediate between said first and second power supply voltages;

a differential amplifier circuit;

an output amplifier circuit; and a control circuit, wherein said differential amplifier circuit that includes:

a differential input stage that differentially receives an input signal at said input terminal and an output signal at said output terminal;

a first current mirror that includes a pair of transistors of a first conductivity type connected to said first power supply terminal;

a second current mirror that includes a pair of transistors of a second conductivity type connected to said second power supply terminal, at least one of said first and second current mirrors receiving an output current of said differential input stage;

a first junction circuit connected between respective input nodes of said first and second current mirrors; and a second junction circuit connected between respective output nodes of said first and second current mirrors, wherein said output amplifier circuit includes:

a first transistor of said first conductivity type that is connected between said first power supply terminal and said output terminal, and has a control terminal connected to a connection node between an output node of said first current mirror and one end of said second junction circuit; and a second transistor of said second conductivity type that is connected between said output terminal and said third power supply terminal and has a control terminal connected to an other end of said second junction circuit, and wherein said control circuit includes a third transistor of said first conductivity type that has a first terminal connected to a connection node between said other end of said second junction circuit and said control terminal of said second transistor of said output amplifier circuit, has a second terminal connected to said output node of said second current mirror and has a control terminal supplied with a first bias voltage having a value in accordance with said third power supply voltage.

2. The output circuit according to claim 1, further comprising:

a bias circuit that includes:

a fourth transistor of a first conductivity type that has a first terminal connected to said third power supply terminal and has a second terminal and a control terminal coupled together; and a load element connected between said second terminal of said fourth transistor and said second power supply terminal, a voltage at said second terminal of said fourth transistor being supplied as said first bias voltage to said control terminal of said third transistor of said first conductivity type.

3. The output circuit according to claim 1, wherein said differential input stage includes:

a first current source that has one end connected to said second power supply terminal;

a first differential pair of transistors of said second conductivity type that have coupled first terminals connected to an other end of said first current source, have control terminals connected respectively to said input terminal and said output terminal, and have second terminals connected respectively to said pair of transistors of said first conductivity type of said first current mirror;

a second current source that has one end connected to said first power supply terminal; and a second differential pair of transistors of said first conductivity type that have coupled first terminals connected to an other end of said second current source, have control terminals connected respectively to said input terminal and said output terminal, and have second terminals connected respectively to said pair of transistors of said second conductivity type of said second current mirror.

4. The output circuit according to claim 3, wherein said first current mirror includes, as said pair transistors of said first conductivity type:

a first pair of transistors of said first conductivity type that have first terminals connected in common to said first power supply terminal and have control terminals coupled together; and a second pair of transistors of said first conductivity type that have first terminals connected respectively to second terminals of said first pair of transistors of said first conductivity type, and have control terminals coupled together and supplied with a second bias voltage, a second terminal of one of said second pair of transistors of said first conductivity type being connected to said coupled control terminals of said first pair of transistors of said first conductivity type to form an input node of said first current mirror, a second terminal of an other transistor of said second pair of transistors of said first conductivity type forming an output node of said first current mirror, said second terminals of said first differential pair of transistors of said second conductivity type being connected respectively to said second terminals of said first pair of transistors of said first conductivity type of said first current mirror, wherein said second current mirror includes, as said pair transistors of said second conductivity type:

a third pair of transistors of said second conductivity type that have first terminals connected in common to said second power supply terminal and have control terminals coupled together; and a fourth pair of transistors of said second conductivity type that have first terminals connected to second terminals of said third pair of transistors of said second conductivity type, and have control terminals coupled together and supplied with a third bias voltage;

a second terminal of one of said fourth pair of transistors of said second conductivity type being connected to said coupled control terminals of said third pair of transistors of said second conductivity type to form an input node of said second current mirror, a second terminal of an other transistor of said fourth pair of transistors of said second conductivity type forming an output node of said second current mirror, said second terminals of said second differential pair of transistors of said first conductivity type being connected respectively to second terminals of said third pair of transistors of said second conductivity type of said second current mirror.

5. The output circuit according to claim 3, wherein said first current mirror includes, as said pair transistors of said first conductivity type:

a first pair of transistors of said first conductivity type that have first terminals connected in common to said first power supply terminal and have control terminals coupled together, a second terminal of one of said first pair of transistors of said first conductivity type being connected to said coupled control terminals of said first pair of transistors of said first conductivity type to form an input node of said first current mirror, a second terminal of the other transistor of said first pair of transistors of said first conductivity type forming an output node of said first current mirror, said second terminals of said first differential pair of transistors of said second conductivity type being connected respectively to said second terminals of said first pair of transistors of said first conductivity type, and wherein said second current mirror includes, as said pair transistors of said second conductivity type:

a second pair of transistors of said second conductivity type that have first terminals connected in common to said second power supply terminal and have control terminals coupled together, a second terminal of one of said second pair transistors of said second conductivity type being connected to said coupled control terminals of said second pair of transistors of said second conductivity type to form an input node of said second current mirror, a second terminal of the other transistor of said second pair of transistors of said second conductivity type forming an output node of said second current mirror, said second terminals of said second differential pair of transistors of said first conductivity type being connected to said second terminals of said second pair of transistors of said second conductivity type.

6. The output circuit according to claim 1, wherein said first junction circuit includes a current source, and wherein said second junction circuit includes a pair of transistors of first and second conductivity types that are connected in parallel to each other between one and the other ends of said second junction circuit, and have control terminals supplied with fourth and fifth bias voltages, respectively.

7. An output circuit comprising:

a positive polarity output circuit including an output circuit, said output circuit as defined in claim 1, wherein said first and second conductivity types are a P-type and an N-type, respectively, and in which said first to third power supply voltages are a high potential power supply voltage, a low potential power supply voltage and a first intermediate potential power supply voltage, respectively; and a negative polarity output circuit including an output circuit, said output circuit as defined in claim 1, wherein said first and second conductivity types are an N-type and a P-type, respectively, and in which said first to third power supply voltages are a low potential power supply voltage, a high potential power supply voltage and a second intermediate potential power supply voltage, respectively.

8. An output circuit comprising:

a positive polarity output circuit including the output circuit according to claim 1, wherein said first and second conductivity types are a P-type and an N-type, respectively, and in which said first to third power supply voltages are a high potential power supply voltage, a low potential power supply voltage and a first intermediate potential power supply voltage, respectively;

a negative polarity output circuit including an output circuit comprising:

an input terminal;

an output terminal;

first, second and third power supply terminals that are supplied with first, second and third power supply voltages, from first, second and third power supplies, respectively, said third power supply voltage being a voltage intermediate between said first and second power supply voltages;

a differential amplifier circuit;

an output amplifier circuit; and a control circuit, wherein said differential amplifier circuit includes:

a differential input stage that differentially receives an input signal at said input terminal and an output signal at said output terminal;

a first current mirror that includes a pair of transistors of a first conductivity type connected to said first power supply terminal;

a second current mirror that includes a pair of transistors of second conductivity type connected to said second power supply terminal, at least one of said first and second current mirrors receiving an output current of said differential input stage;

a first junction circuit connected between respective input nodes of said first and second current mirrors; and a second junction circuit connected between respective output nodes of said first and second current mirrors, wherein said output amplifier circuit includes:

a first transistor of a first conductivity type that is connected between said third power supply terminal and said output terminal and has a control terminal connected to one end of said second junction circuit; and a second transistor of a second conductivity type that is connected between said output terminal and said second power supply terminal and has a control terminal connected to a connection node between an other end of said second junction circuit and an output node of said second current mirror, and wherein said control circuit includes a third transistor of a second conductivity type that has a first terminal connected to a connection node between said one end of said second junction circuit and a control terminal of said first transistor of said output amplifier circuit, has a second terminal connected to said output node of said first current mirror, and a control terminal supplied with a first bias voltage having a value in accordance with said third power supply voltage, wherein said first and second conductivity types are a P-type and an N-type, respectively, and in which said first to third power supply voltages are a high potential power supply voltage, a low potential power supply voltage and a second intermediate potential power supply voltage, respectively.

9. A data driver comprising a plurality of output circuits, each of said output circuits being as defined in claim 1.

10. A display apparatus including a data driver, said data driver being as defined in claim 9.

11. A data driver comprising:

a plurality of output circuits, each of said output circuits being as defined in claim 1; and a bias circuit, provided in common for plurality of said output circuits, said bias circuit including a fourth transistor of a first conductivity type that has a first terminal connected to said third power supply terminal and has second and control terminals coupled together; and a load element that is connected between said second terminal of said fourth transistor and said second power supply terminal, said bias circuit providing a voltage at said second terminal of said fourth transistor as said first bias voltage.

12. An output circuit comprising:

an input terminal;

an output terminal;

first, second and third power supply terminals that are supplied with first, second and third power supply voltages, from first, second and third power supplies, respectively, said third power supply voltage being a voltage intermediate between said first and second power supply voltages;

a differential amplifier circuit;

an output amplifier circuit; and a control circuit, wherein said differential amplifier circuit includes:

a differential input stage that differentially receives an input signal at said input terminal and an output signal at said output terminal;

a first current mirror that includes a pair of transistors of a first conductivity type connected to said first power supply terminal;

a second current mirror that includes a pair of transistors of second conductivity type connected to said second power supply terminal, at least one of said first and second current mirrors receiving an output current of said differential input stage;

a first junction circuit connected between respective input nodes of said first and second current mirrors; and a second junction circuit connected between respective output nodes of said first and second current mirrors, wherein said output amplifier circuit includes:

a first transistor of a first conductivity type that is connected between said third power supply terminal and said output terminal and has a control terminal connected to one end of said second junction circuit; and a second transistor of a second conductivity type that is connected between said output terminal and said second power supply terminal and has a control terminal connected to a connection node between an other end of said second junction circuit and an output node of said second current mirror, and wherein said control circuit includes a third transistor of a second conductivity type that has a first terminal connected to a connection node between said one end of said second junction circuit and said control terminal of said first transistor of said output amplifier circuit, has a second terminal connected to said output node of said first current mirror, and a control terminal supplied with a first bias voltage having a value in accordance with said third power supply voltage.

13. The output circuit according to claim 12, further comprising:

a bias circuit includes:

a fourth transistor of a second conductivity type that has a first terminal connected to said third power supply terminal and has a second terminal and a control terminals coupled together; and a load element that is connected between said first power supply terminal and said second terminal of said fourth transistor, a voltage at said second terminal of said fourth transistor being supplied as said first bias voltage to said control terminal of third transistor of said second conductivity type.

14. The output circuit according to claim 12, wherein said differential input stage includes:

a first current source that has one end connected to said second power supply terminal;

a first differential pair of transistors of said second conductivity type that have coupled first terminals connected to an other end of said first current source, have control terminals connected respectively to said input terminal and said output terminal, and have second terminals connected respectively to said pair of transistors of said first conductivity type of said first current mirror;

a second current source that has one end connected to said first power supply terminal; and a second differential pair of transistors of said first conductivity type that have coupled first terminals connected to an other end of said second current source, have control terminals connected respectively to said input terminal and said output terminal, and have second terminals connected respectively to said pair of transistors of said second conductivity type of said second current mirror.

15. The output circuit according to claim 14, wherein said first current mirror includes, as said pair transistors of said first conductivity type:

a first pair of transistors of said first conductivity type that have first terminals connected in common to said first power supply terminal and have control terminals coupled together; and a second pair of transistors of said first conductivity type that have first terminals connected respectively to second terminals of said first pair of transistors of said first conductivity type, and have control terminals coupled together and supplied with a second bias voltage, a second terminal of one of said second pair of transistors of said first conductivity type being connected to said coupled control terminals of said first pair of transistors of said first conductivity type to form an input node of said first current mirror, a second terminal of an other transistor of said second pair of transistors of said first conductivity type forming an output node of said first current mirror, said second terminals of said first differential pair of transistors of said second conductivity type being connected respectively to said second terminals of said first pair of transistors of said first conductivity type of said first current mirror, wherein said second current mirror includes, as said pair transistors of said second conductivity type:

a third pair of transistors of said second conductivity type that have first terminals connected in common to said second power supply terminal and have control terminals coupled together; and a fourth pair of transistors of said second conductivity type that have first terminals connected to second terminals of said third pair of transistors of said second conductivity type, and have control terminals coupled together and supplied with a third bias voltage;

a second terminal of one of said fourth pair of transistors of said second conductivity type being connected to said coupled control terminals of said third pair of transistors of said second conductivity type to form an input node of said second current mirror, a second terminal of an other transistor of said fourth pair of transistors of said second conductivity type forming an output node of said second current mirror, said second terminals of said second differential pair of transistors of said first conductivity type being connected respectively to second terminals of said third pair of transistors of said second conductivity type of said second current mirror.

16. The output circuit according to claim 14, wherein said first current mirror includes, as said pair transistors of said first conductivity type:

a first pair of transistors of said first conductivity type that have first terminals connected in common to said first power supply terminal and have control terminals coupled together, a second terminal of one of said first pair of transistors of said first conductivity type being connected to said coupled control terminals of said first pair of transistors of said first conductivity type to form an input node of said first current mirror, a second terminal of the other transistor of said first pair of transistors of said first conductivity type forming an output node of said first current mirror, said second terminals of said first differential pair of transistors of said second conductivity type being connected respectively to said second terminals of said first pair of transistors of said first conductivity type, and wherein said second current mirror includes, as said pair transistors of said second conductivity type:

a second pair of transistors of said second conductivity type that have first terminals connected in common to said second power supply terminal and have control terminals coupled together, a second terminal of one of said second pair transistors of said second conductivity type being connected to said coupled control terminals of said second pair of transistors of said second conductivity type to form an input node of said second current mirror, a second terminal of the other transistor of said second pair of transistors of said second conductivity type forming an output node of said second current mirror, said second terminals of said second differential pair of transistors of said first conductivity type being connected to said second terminals of said second pair of transistors of said second conductivity type.

17. The output circuit according to claim 12, wherein said first junction circuit includes a current source, and wherein said second junction circuit includes a pair of transistors of first and second conductivity types that are connected in parallel to each other between one and the other ends of said second junction circuit, and have control terminals supplied with fourth and fifth bias voltages, respectively.

18. A data driver comprising a plurality of output circuits, each of said output circuits being as defined in claim 12.

19. A display apparatus including a data driver, said data driver being as defined in claim 18.

20. A data driver comprising:

a plurality of output circuits, each of said output circuits being as defined in claim 12; and a bias circuit, provided in common for plurality of said output circuits, said bias circuit including a fourth transistor of a second conductivity type that has a first terminal connected to said third power supply terminal and has second and control terminals coupled together; and a load element that is connected between said first power supply terminal and said second terminal of said fourth transistor, said bias circuit providing a voltage at said second terminal of said fourth transistor as said first bias voltage.

* * * * *